US012053871B2

(12) United States Patent
Chang et al.

(10) Patent No.: US 12,053,871 B2
(45) Date of Patent: Aug. 6, 2024

(54) IMPACT TOOL

(71) Applicant: MAKITA CORPORATION, Anjo (JP)

(72) Inventors: Juan Chang, Kunshan (CN); Haohao Wang, Kunshan (CN); Wei Yang, Kunshan (CN); Haruki Tejima, Anjo (JP)

(73) Assignee: MAKITA CORPORATION, Anjo (JP)

(*) Notice: Subject to any disclaimer, the term of this patent is extended or adjusted under 35 U.S.C. 154(b) by 0 days.

(21) Appl. No.: 18/137,009

(22) Filed: Apr. 20, 2023

(65) Prior Publication Data

US 2023/0390914 A1 Dec. 7, 2023

(30) Foreign Application Priority Data

Jun. 7, 2022 (JP) ................................ 2022-092519

(51) Int. Cl.
*B25F 5/02* (2006.01)
*B25B 21/02* (2006.01)

(52) U.S. Cl.
CPC ................ *B25F 5/02* (2013.01); *B25B 21/02* (2013.01)

(58) Field of Classification Search
CPC ... B25F 5/02; B25F 5/00; B25F 5/001; H02K 7/145; H02K 11/33; H02K 11/28; H02K 5/04; H02K 21/12
USPC ............................................ 173/217, 48, 93
See application file for complete search history.

(56) References Cited

U.S. PATENT DOCUMENTS

| | | | | |
|---|---|---|---|---|
| 2010/0000750 A1* | 1/2010 | Andel | ................... | B25B 21/026 173/217 |
| 2019/0028003 A1 | 1/2019 | Seith et al. | | |
| 2019/0291259 A1* | 9/2019 | Herr | .......................... | B25F 5/00 |
| 2020/0023503 A1 | 1/2020 | Malak et al. | | |
| 2021/0060755 A1 | 3/2021 | Kawai | | |

FOREIGN PATENT DOCUMENTS

| | | |
|---|---|---|
| EP | 2 140 976 B1 | 11/2011 |
| JP | 3894106 B2 | 3/2007 |
| JP | 2018-051713 A | 4/2018 |
| JP | 6801571 B2 | 12/2020 |
| JP | 2021-037560 A | 3/2021 |

* cited by examiner

*Primary Examiner* — Jacob A Smith
(74) *Attorney, Agent, or Firm* — Oliff PLC

(57) ABSTRACT

An impact tool is less likely to have a shorter service life. An impact tool includes a motor, a spindle, a hammer, an anvil, and a lid. The spindle is rotatable by the motor. The spindle has an opening in a rear end face of the spindle, an internal space extending frontward from the opening and including a first space containing a lubricant oil and a second space connecting to a rear end of the first space, and a first feed port in an outer circumferential surface of the spindle. The hammer surrounds the spindle. The anvil is strikable by the hammer in a rotation direction. The lid is placeable through the opening into the second space. The first feed port allows supply of the lubricant oil from the first space to between the spindle and the hammer.

17 Claims, 8 Drawing Sheets

IMPACT TOOL

CROSS-REFERENCE TO RELATED APPLICATIONS

This application claims the benefit of priority to Japanese Patent Application No. 2022-092519, filed on Jun. 7, 2022, the entire contents of which are hereby incorporated by reference.

BACKGROUND

1. Technical Field

The present disclosure relates to an impact tool.

2. Description of the Background

In the field of impact tools, a known impact tool is described in Japanese Unexamined Patent Application Publication No. 2021-037560. The impact tool includes a spindle and a hammer surrounding the spindle. The spindle contains a lubricant oil in its internal space. A lubricant oil is supplied to between the spindle and the hammer from the internal space of the spindle.

BRIEF SUMMARY

Any leak of the lubricant oil from the internal space of the spindle can reduce the amount of lubricant oil supplied to between the spindle and the hammer. This may cause severe wear or seizure of either the spindle or the hammer or both and may shorten the service life of the impact tool.

One or more aspects of the present disclosure are directed to an impact tool that is less likely to have a shorter service life.

A first aspect of the present disclosure provides an impact tool, including:

- a motor;
- a spindle at least partially located frontward from the motor, the spindle being rotatable by the motor, the spindle having
  - an opening in a rear end face of the spindle,
  - an internal space extending frontward from the opening, the internal space including
    - a first space containing a lubricant oil, and
    - a second space connecting to a rear end of the first space, and
  - a first feed port in an outer circumferential surface of the spindle;
- a hammer surrounding the spindle;
- an anvil at least partially located frontward from the spindle, the anvil being strikable by the hammer in a rotation direction; and
- a lid placeable through the opening into the second space,
- wherein the first feed port allows supply of the lubricant oil from the first space to between the spindle and the hammer.

The impact tool according to the above aspect of the present disclosure is less likely to have a shorter service life.

DETAILED DESCRIPTION

Embodiments

One or more embodiments will now be described with reference to the drawings. In the embodiments, the positional relationships between the components will be described using the directional terms such as right and left (or lateral), front and rear (or frontward and rearward), and up and down. The terms indicate relative positions or directions with respect to the center of an impact tool 1. The impact tool 1 includes a motor 6 as a power supply.

In the embodiments, a direction parallel to a rotation axis AX of the motor 6 is referred to as an axial direction for convenience. A direction about the rotation axis AX is referred to as a circumferential direction or circumferentially, or a rotation direction for convenience. A direction radial from the rotation axis AX is referred to as a radial direction or radially for convenience.

The rotation axis AX extends in a front-rear direction. A first axial direction is from the rear to the front, and a second axial direction is from the front to the rear. A position adjacent to the rotation axis AX in the radial direction, or a radial direction toward the rotation axis AX, is referred to as radially inward for convenience. A position farther from the rotation axis AX in the radial direction, or a radial direction away from the rotation axis AX, is referred to as radially outside or radially outward for convenience.

Impact Tool

Figure 1:
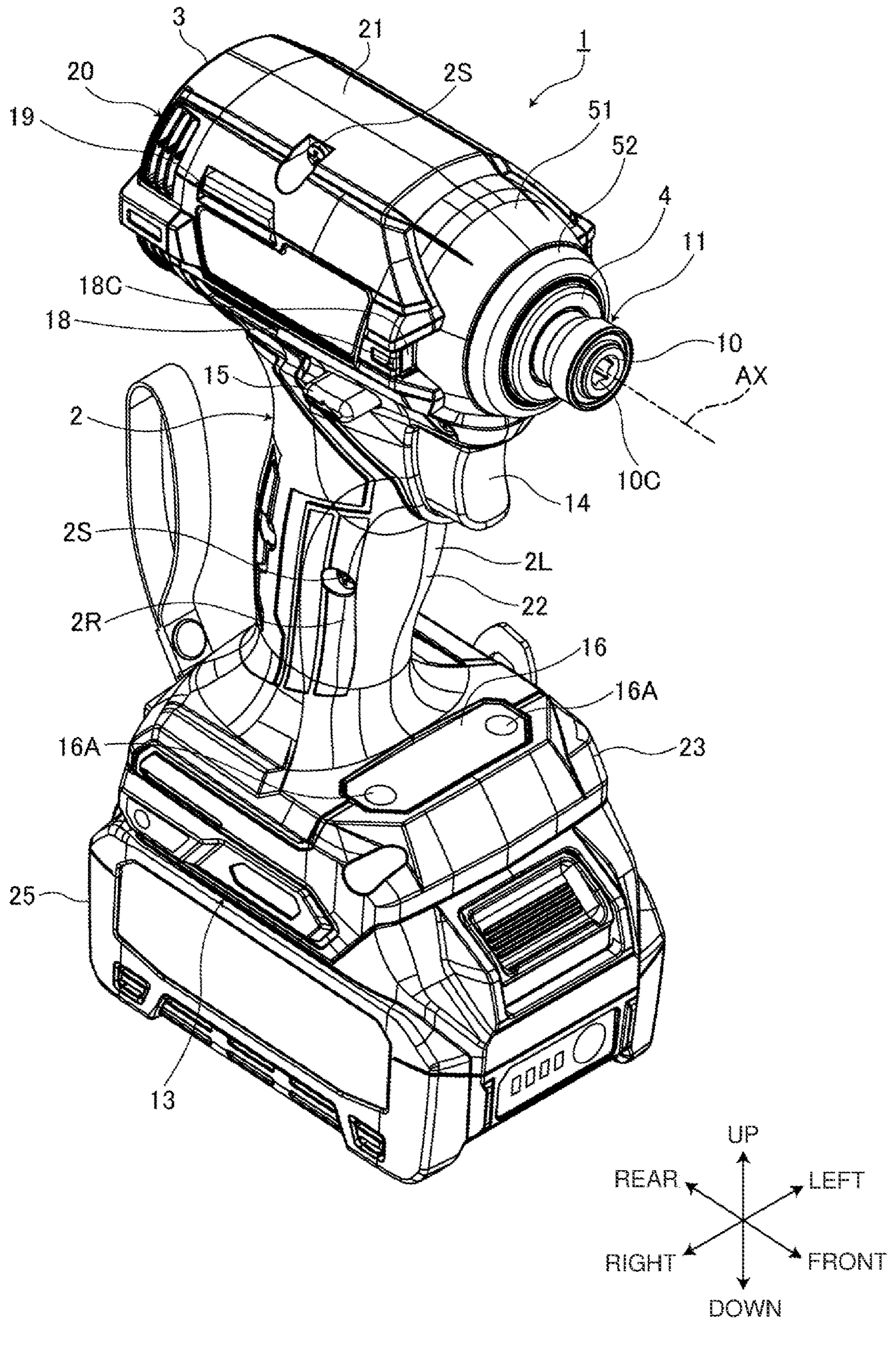
FIG. 1 is a perspective view of an impact tool according to an embodiment as viewed from the front.
Figure 2:
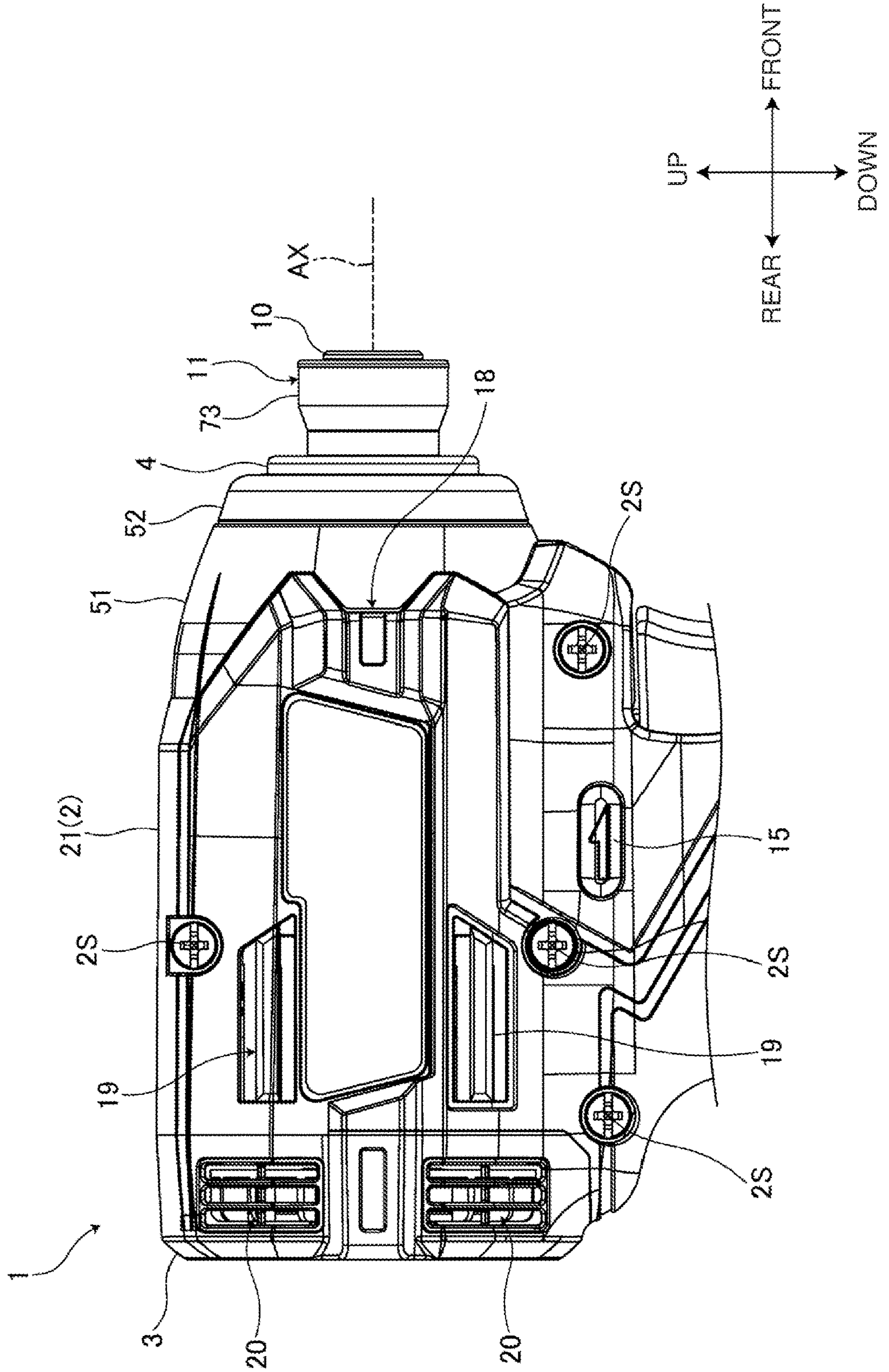
FIG. 2 is a side view of an upper portion of the impact tool according to the embodiment.
Figure 3:
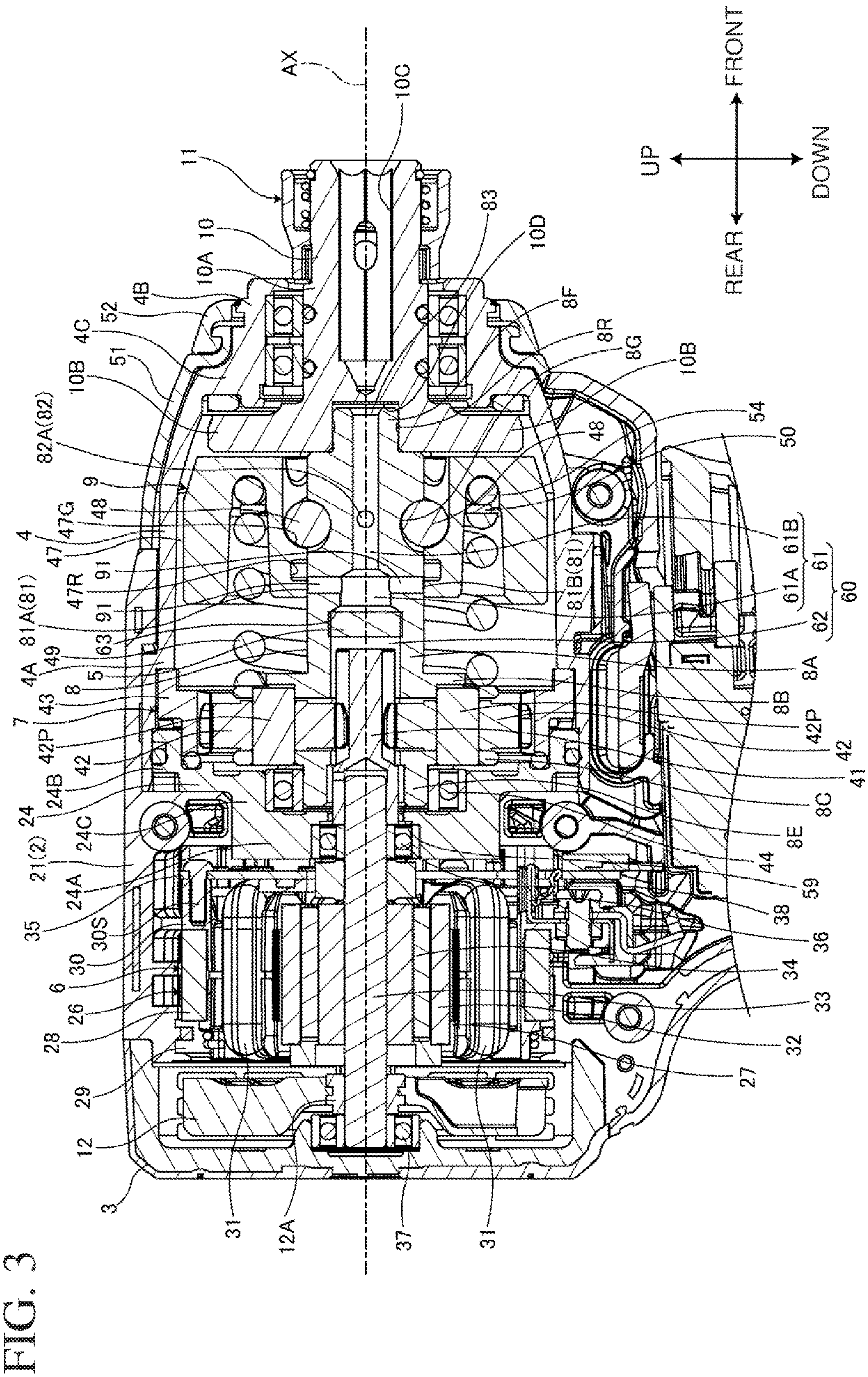
FIG. 3 is a longitudinal sectional view of the upper portion of the impact tool according to the embodiment.
Figure 4:
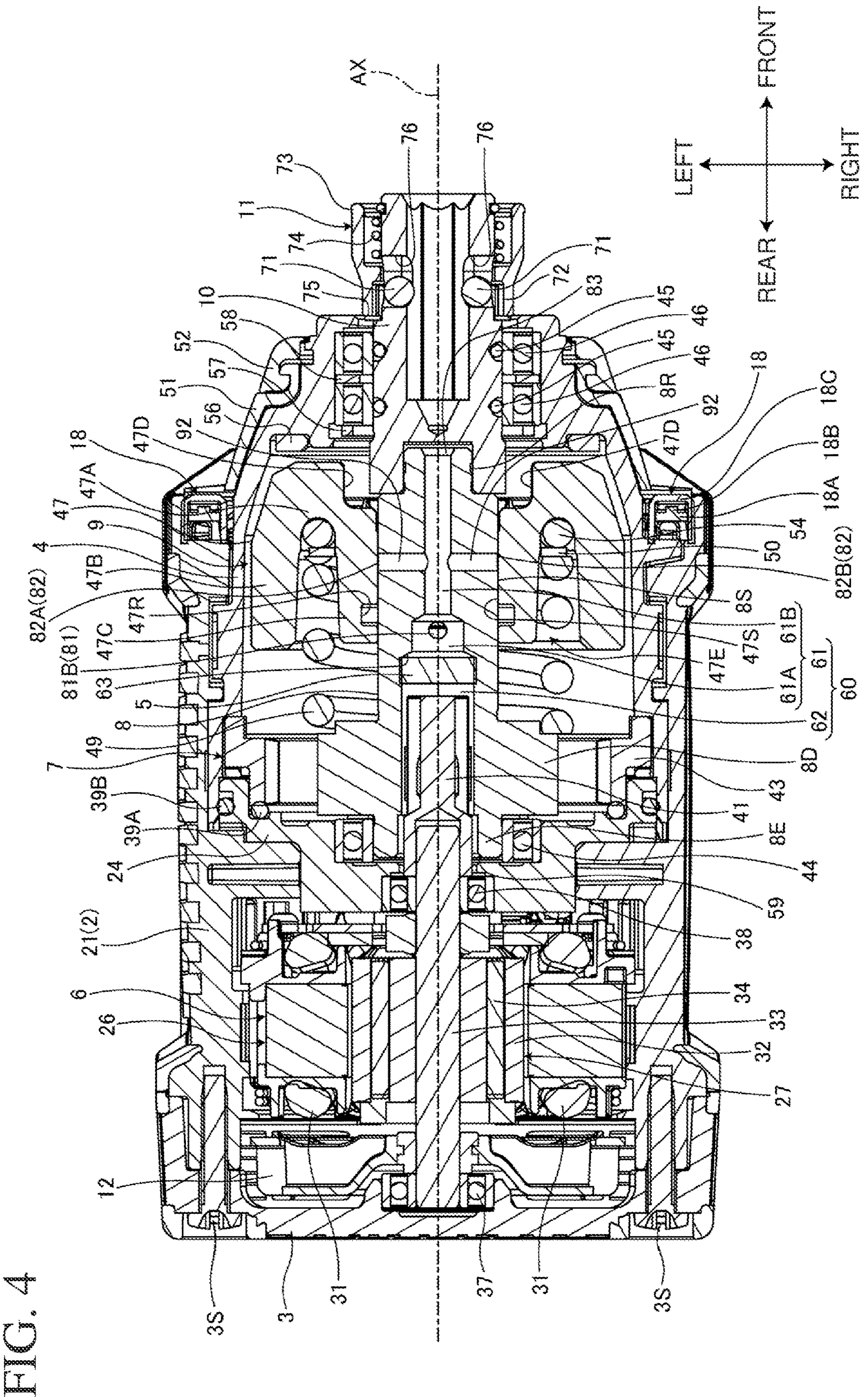
FIG. 4 is a horizontal sectional view of the upper portion of the impact tool according to the embodiment.
Figure 5:
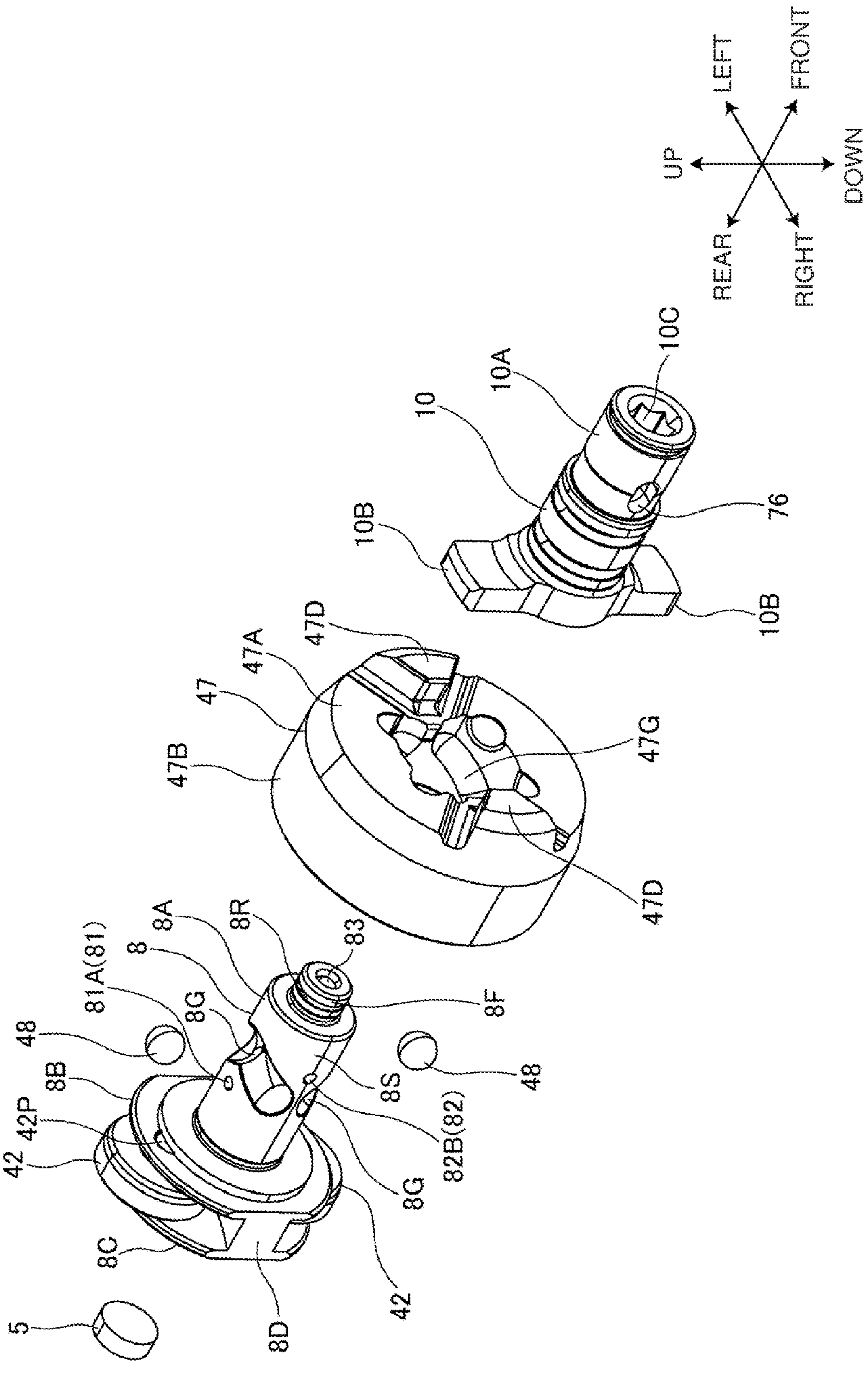
FIG. 5 is a partially exploded perspective view of the impact tool according to the embodiment as viewed from the front.
Figure 6:
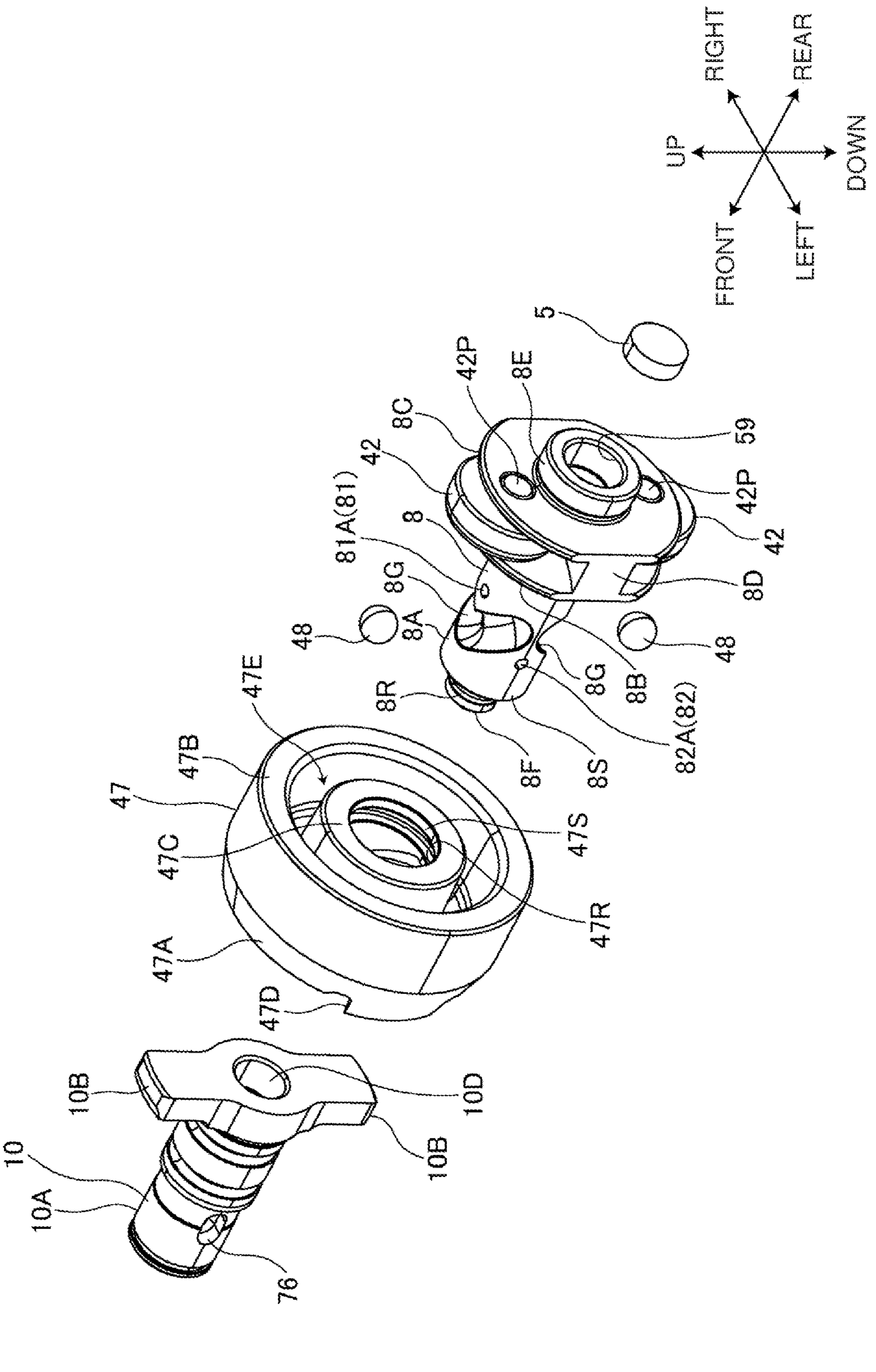
FIG. 6 is a partially exploded perspective view of the impact tool according to the embodiment as viewed from the rear.

FIG. 1 is a perspective view of the impact tool 1 according to an embodiment as viewed from the front. FIG. 2 is a side view of an upper portion of the impact tool 1. FIG. 3 is a longitudinal sectional view of the upper portion of the impact tool 1. FIG. 4 is a horizontal sectional view of the upper portion of the impact tool 1. FIG. 5 is a partially exploded perspective view of the impact tool 1 as viewed from the front. FIG. 6 is a partially exploded perspective view of the impact tool 1 as viewed from the rear.

The impact tool 1 according to the embodiment is an impact driver that is a screwing machine. The impact tool 1 includes a housing 2, a rear cover 3, a hammer case 4, a bearing box 24, a hammer case cover 51, a bumper 52, a motor 6, a reducer 7, a spindle 8, a striker 9, an anvil 10, a tool holder 11, a fan 12, a battery mount 13, a trigger lever 14, a forward-reverse switch lever 15, an operation display 16, and a light assembly 18.

The housing 2 is formed from a synthetic resin. The housing 2 in the embodiment is formed from nylon. The housing 2 includes a left housing 2L and a right housing 2R. The right housing 2R is located on the right of the left housing 2L. The left housing 2L and the right housing 2R are fastened together with multiple screws 2S. The housing 2 includes a pair of housing halves.

The housing 2 includes a motor compartment 21, a grip 22, and a battery holder 23.

The motor compartment 21 accommodates the motor 6. The motor compartment 21 accommodates at least a part of the hammer case 4. The motor compartment 21 is cylindrical.

The grip 22 is grippable by an operator. The grip 22 extends downward from the motor compartment 21. The trigger lever 14 is located in an upper portion of the grip 22.

The battery holder 23 holds a battery pack 25 with the battery mount 13. The battery holder 23 is connected to a lower end of the grip 22. The battery holder 23 has larger outer dimensions than the grip 22 in the front-rear and lateral directions.

The rear cover 3 covers an opening at the rear end of the motor compartment 21. The rear cover 3 is located at the rear of the motor compartment 21. The rear cover 3 accommodates at least a part of the fan 12. The fan 12 is located inward from the rear cover 3. A rear rotor bearing 37 is held by the rear cover 3. The rear cover 3 is formed from a synthetic resin. The rear cover 3 is fastened to the motor compartment 21 with two screws 3S.

The motor compartment 21 has inlets 19. The rear cover 3 has outlets 20. Air outside the housing 2 flows into an internal space of the housing 2 through the inlets 19. The air then flows out of the housing 2 through the outlets 20.

The hammer case 4 accommodates at least a part of the reducer 7, the spindle 8, the striker 9, and at least a part of the anvil 10. The hammer case 4 is formed from a metal. The hammer case 4 in the embodiment is formed from aluminum. The hammer case 4 is cylindrical. The hammer case 4 includes a larger cylinder 4A, a smaller cylinder 4B, and a connecting portion 4C. The smaller cylinder 4B is located frontward from the larger cylinder 4A. The front end of the larger cylinder 4A and the rear end of the smaller cylinder 4B are connected to each other with the connecting portion 4C. The connecting portion 4C is annular. The larger cylinder 4A has a larger outer diameter than the smaller cylinder 4B. The larger cylinder 4A has a larger inner diameter than the smaller cylinder 4B.

The bearing box 24 accommodates at least a part of the reducer 7. The bearing box 24 holds a front rotor bearing 38 and a spindle bearing 44. The bearing box 24 is formed from a metal. The bearing box 24 is fastened to a rear portion of the hammer case 4.

The bearing box 24 includes a rear annular portion 24A and a front annular portion 24B. The front annular portion 24B is located frontward from the rear annular portion 24A. The front end of the rear annular portion 24A and the rear end of the front annular portion 24B are connected to each other with a connecting portion 24C. The connecting portion 24C is annular. The rear annular portion 24A has a smaller outer diameter than the front annular portion 24B. The rear annular portion 24A has a smaller inner diameter than the front annular portion 24B.

The bearing box 24 and the hammer case 4 may be fastened together by screwing together or by fitting together (engagement). For example, the front annular portion 24B may have threads on its outer circumference, and the larger cylinder 4A may have threaded grooves on its inner circumference. The threads on the front annular portion 24B may be engaged with the threaded grooves on the larger cylinder 4A to fasten the bearing box 24 and the hammer case 4 together. The front annular portion 24B may be fitted in the larger cylinder 4A to fasten the bearing box 24 and the hammer case 4 together. The front rotor bearing 38 is located radially inward from the rear annular portion 24A. The spindle bearing 44 is located radially inward from the connecting portion 24C.

The hammer case 4 is held between the left housing 2L and the right housing 2R. The hammer case 4 includes the rear portion accommodated in the motor compartment 21. The hammer case 4 connects to a front portion of the motor compartment 21. The bearing box 24 is fixed to the motor compartment 21 and the hammer case 4.

The hammer case cover 51 protects the hammer case 4. The hammer case cover 51 prevents contact between the hammer case 4 and objects nearby. The hammer case cover 51 covers the outer circumferential surface of the larger cylinder 4A. The hammer case cover 51 may be eliminated.

The bumper 52 protects the hammer case 4. The bumper 52 prevents contact between the hammer case 4 and objects nearby. The bumper 52 reduces the impact of contact with an object. The bumper 52 surrounds the smaller cylinder 4B.

The motor 6 is a power source for the impact tool 1. The motor 6 is an inner-rotor brushless motor. The motor 6 includes a stator 26 and a rotor 27. The stator 26 is supported on the motor compartment 21. The rotor 27 is located at least partially inward from the stator 26. The rotor 27 rotates relative to the stator 26. The rotor 27 rotates about the rotation axis AX extending in the front-rear direction.

The stator 26 includes a stator core 28, a rear insulator 29, a front insulator 30, and multiple coils 31.

The stator core 28 includes multiple steel plates stacked on one another. The steel plates are metal plates formed from iron as a main component. The stator core 28 is cylindrical. The stator core 28 is located radially outside the rotor 27. The stator core 28 includes multiple teeth to support the coils 31.

The rear insulator 29 and the front insulator 30 are electrical insulating members formed from a synthetic resin. The rear insulator 29 and the front insulator 30 each electrically insulate the stator core 28 and the coils 31. The rear insulator 29 is fixed to the rear of the stator core 28. The front insulator 30 is fixed to the front of the stator core 28. The rear insulator 29 partially covers the surfaces of the teeth. The front insulator 30 partially covers the surfaces of the teeth.

The coils 31 surround the teeth on the stator core 28 with the rear insulator 29 and the front insulator 30 in between. The coils 31 and the stator core 28 are electrically insulated from each other with the front insulator 30 and the rear insulator 29 in between. The coils 31 are connected to one another with fusing terminals 36.

The rotor 27 rotates about the rotation axis AX. The rotor 27 includes a rotor core 32, a rotor shaft 33, and a rotor magnet 34.

The rotor core 32 and the rotor shaft 33 are formed from steel. The rotor core 32 is substantially cylindrical. The rotor shaft 33 is located radially inward from the rotor core 32. The rotor core 32 is fixed to the rotor shaft 33. The rotor shaft 33 has a rear end protruding rearward from the rear end face of the rotor core 32. The rotor shaft 33 has a front end protruding frontward from the front end face of the rotor core 32.

The rotor magnet 34 is fixed to the rotor core 32. The rotor magnet 34 is located inside the rotor core 32.

A sensor board 35 is attached to the front insulator 30. The sensor board 35 is fastened to the front insulator 30 with a screw 30S. The sensor board 35 includes an annular circuit board, and a rotation detector supported on the circuit board. The sensor board 35 at least partially faces the front end face of the rotor magnet 34. The rotation detector detects the position of the rotor magnet 34 to detect the position of the rotor 27 in the rotation direction.

The rotor shaft 33 has the rear end rotatably supported by the rear rotor bearing 37. The rotor shaft 33 has the front end rotatably supported by the front rotor bearing 38. The rear rotor bearing 37 is held by the rear cover 3. The front rotor bearing 38 is held by the bearing box 24.

The front end of the rotor shaft 33 is located in the internal space of the hammer case 4 through an opening of the rear annular portion 24A.

A pinion gear 41 is fixed to the front end of the rotor shaft 33. The pinion gear 41 is connected to at least a part of the reducer 7. The rotor shaft 33 is connected to the reducer 7 with the pinion gear 41.

The reducer 7 connects the rotor shaft 33 and the spindle 8 together. The rotor 27 drives gears in the reducer 7. The reducer 7 transmits rotation of the rotor 27 to the spindle 8. The reducer 7 rotates the spindle 8 at a lower rotational speed than the rotor shaft 33. The reducer 7 is located frontward from the stator 26. The reducer 7 includes a planetary gear assembly.

The reducer 7 includes multiple planetary gears 42 and an internal gear 43. The multiple planetary gears 42 surround the pinion gear 41. The internal gear 43 surrounds the multiple planetary gears 42. The pinion gear 41, the planetary gears 42, and the internal gear 43 are accommodated in the hammer case 4. Each planetary gear 42 meshes with the pinion gear 41. The planetary gears 42 are rotatably supported by the spindle 8 with a pin 42P in between. The spindle 8 is rotated by the planetary gears 42. The internal gear 43 includes internal teeth that mesh with the planetary gears 42.

The internal gear 43 is fixed to the larger cylinder 4A in the hammer case 4. The internal gear 43 is constantly nonrotatable relative to the hammer case 4. An O-ring 39A is located at the boundary between the rear end of the internal gear 43 and the bearing box 24. An O-ring 39B is located at the boundary between the bearing box 24 and the hammer case 4.

When the rotor shaft 33 rotates as driven by the motor 6, the pinion gear 41 rotates, and the planetary gears 42 revolve about the pinion gear 41. The planetary gears 42 revolve while meshing with the internal teeth on the internal gear 43. The revolving planetary gears 42 rotate the spindle 8, connected to the planetary gears 42 with the pin 42P, at a lower rotational speed than the rotor shaft 33.

The spindle 8 is rotated about the rotation axis AX by the motor 6. The spindle 8 is rotated by the rotor 27. The spindle 8 rotates with a rotational force from the rotor 27 transmitted through the reducer 7. The spindle 8 transmits a rotational force from the motor 6 to the anvil 10 through balls 48 and a hammer 47. The spindle 8 is located at least partially frontward from the motor 6. The spindle 8 is located frontward from the stator 26. The spindle 8 is located at least partially frontward from the rotor 27. The spindle 8 is located at least partially frontward from the reducer 7. The spindle 8 is at least partially located rearward from the anvil 10.

The spindle 8 includes a spindle shaft 8A, a first flange 8B, a second flange 8C, a connecting portion 8D, a holder 8E, and a spindle protrusion 8F.

The spindle shaft 8A is a rod elongated in the front-rea direction. The spindle shaft 8A has the central axis aligned with the rotation axis AX. The first flange 8B extends radially outward from the rear end of the outer circumferential surface of the spindle shaft 8A. The second flange 8C is located rearward from the first flange 8B. The second flange 8C is annular. The connecting portion 8D connects a portion of the first flange 8B to a portion of the second flange 8C. The holder 8E protrudes rearward from the rear surface of the second flange 8C. The holder 8E is cylindrical. The spindle protrusion 8F protrudes frontward from the front end of the spindle shaft 8A.

The first flange 8B supports the front end of the pin 42P. The second flange 8C supports the rear end of the pin 42P. The planetary gears 42 are located between the first flange 8B and the second flange 8C. The planetary gears 42 are rotatably supported by the first flange 8B and the second flange 8C with the pin 42P. The spindle bearing 44 surrounds the holder 8E. The spindle bearing 44 holds the holder 8E. The spindle bearing 44 is held by the bearing box 24.

The striker 9 is driven by the motor 6. The rotational force from the motor 6 is transmitted to the striker 9 through the reducer 7 and the spindle 8. The striker 9 strikes the anvil 10 in the rotation direction in response to the rotational force of the spindle 8 rotated by the motor 6. The striker 9 includes the hammer 47, two balls 48, a coil spring 49, and a washer 50. The striker 9 including the hammer 47, the balls 48, the coil spring 49, and the washer 50 is accommodated in the larger cylinder 4A in the hammer case 4.

The hammer 47 is located frontward from the reducer 7. The hammer 47 surrounds the spindle 8. The hammer 47 surrounds the spindle shaft 8A. The hammer 47 is held by the spindle shaft 8A. The balls 48 are located between the spindle 8 and the hammer 47.

The hammer 47 includes a body 47A, an outer cylinder 47B, an inner cylinder 47C, and two hammer protrusions 47D. The body 47A surrounds the spindle shaft 8A. The body 47A is annular. The outer cylinder 47B and the inner cylinder 47C both protrude rearward from the body 47A. The outer cylinder 47B is located radially outside the inner cylinder 47C. A recess 47E is defined by the rear surface of the body 47A, the inner circumferential surface of the outer cylinder 47B, and the outer circumferential surface of the inner cylinder 47C. The recess 47E is recessed frontward from the rear end of the hammer 47. The recess 47E is annular. The spindle shaft 8A is located radially inward from the body 47A and the inner cylinder 47C. The inner cylinder 47C has an inner circumferential surface 47S in contact with an outer circumferential surface 8S of the spindle shaft 8A. The hammer protrusions 47D protrude frontward from the body 47A.

The hammer 47 is rotated by the motor 6. The rotational force from the motor 6 is transmitted to the hammer 47 through the reducer 7 and the spindle 8. The hammer 47 is rotatable together with the spindle 8 in response to the rotational force of the spindle 8 rotated by the motor 6. The rotation axis of the hammer 47 and the rotation axis of the spindle 8 align with the rotation axis AX of the motor 6. The hammer 47 rotates about the rotation axis AX.

The washer 50 is received in the recess 47E. The washer 50 is supported by the hammer 47 with multiple balls 54 in between. The balls 54 are located frontward from the washer 50. The balls 54 are located between the rear surface of the body 47A and the front surface of the washer 50.

The coil spring 49 surrounds the spindle shaft 8A. The coil spring 49 has the rear end supported by the first flange 8B. The coil spring 49 has the front end received in the recess 47E and supported by the washer 50. The coil spring 49 constantly generates an elastic force for moving the hammer 47 forward.

The balls 48 are formed from a metal such as steel. The balls 48 are located between the spindle shaft 8A and the body 47A. The spindle shaft 8A has spindle grooves 8G. The spindle grooves 8G receive at least parts of the balls 48. The spindle grooves 8G are on the outer circumferential surface of the spindle shaft 8A. The hammer 47 has hammer grooves 47G. The hammer grooves 47G receive at least parts of the balls 48. The hammer grooves 47G are located on the inner circumferential surfaces of the body 47A and the inner cylinder 47C.

The two spindle grooves 8G are located on the outer circumferential surface of the spindle shaft 8A. The two hammer grooves 47G are located on the inner circumferential surfaces of the body 47A and the inner cylinder 47C. A first ball 48 is located between a first spindle groove 8G and a first hammer groove 47G. A second ball 48 is located between a second spindle groove 8G and a second hammer groove 47G. The balls 48 roll along the spindle grooves 8G and the hammer grooves 47G. The hammer 47 is movable together with the balls 48. The spindle 8 and the hammer 47 are movable relative to each other in the axial direction and in the rotation direction within a movable range defined by the spindle grooves 8G and the hammer grooves 47G.

The anvil 10 is located frontward from the motor 6. The anvil 10 is an output unit of the impact tool 1 that rotates in response to the rotational force of the rotor 27. The anvil 10 is at least partially located frontward from the spindle 8. The anvil 10 is located at least partially frontward from the hammer 47. The anvil 10 is struck by the hammer 47 in the rotation direction.

The anvil 10 includes an anvil shaft 10A and two anvil protrusions 10B. The anvil shaft 10A is a rod elongated in the front-rear direction. The anvil shaft 10A has the central axis aligned with the rotation axis AX. The anvil protrusions 10B are located at the rear end of the anvil shaft 10A. The anvil protrusions 10B protrude radially outward from the rear end of the anvil shaft 10A. A washer 56 is located frontward from the anvil protrusions 10B. The washer 56 is supported on the rear surface of the connecting portion 4C. The washer 56 prevents contact between the anvil protrusions 10B and the hammer case 4.

The anvil 10 has a tool hole 10C in its front end face. The anvil 10 has an anvil recess 10D on its rear end face. The tool hole 10C extends rearward from the front end face of the anvil shaft 10A. The tool hole 10C receives a tip tool. The tip tool is attached to the anvil 10. The anvil recess 10D is recessed frontward from the rear end face of the anvil 10. The anvil recess 10D receives the spindle protrusion 8F.

The anvil projection may protrude rearward from the rear end face of the anvil 10. A spindle recess may then be located on the front end face of the spindle 8 to receive the anvil projection.

The anvil 10 is rotatably supported by anvil bearings 46. The rotation axis of the anvil 10 aligns with the rotation axis of the hammer 47, the rotation axis of the spindle 8, and the rotation axis AX of the motor 6. The anvil 10 rotates about the rotation axis AX. The anvil bearings 46 surround the anvil shaft 10A. The anvil bearings 46 are located inside the smaller cylinder 4B in the hammer case 4. The anvil bearings 46 are held by the smaller cylinder 4B of the hammer case 4. The anvil bearings 46 support a front portion of the anvil shaft 10A in a rotatable manner. In the embodiment, two anvil bearings 46 are arranged in the front-reardirection. The washer 58 is located between a front anvil bearing 46 and a rear anvil bearing 46. A support 57 is located rearward from the rear anvil bearing 46. The support 57 is, for example, a snap ring. The support 57 is received in a groove on the inner circumferential surface of the smaller cylinder 4B. The support 57 reduces the likelihood of the anvil bearings 46 slipping rearward from the smaller cylinder 4B. An O-ring 45 is located between each anvil bearing 46 and the anvil shaft 10A.

The hammer protrusions 47D can come in contact with the anvil protrusions 10B. When the motor 6 operates with the hammer protrusions 47D and the anvil protrusions 10B in contact with each other, the anvil 10 rotates together with the hammer 47 and the spindle 8.

The anvil 10 is struck by the hammer 47 in the rotation direction. When, for example, the anvil 10 receives a higher load in a screwing operation, the anvil 10 may fail to rotate with an urging force from the coil spring 49 alone. This stops rotation of the anvil 10 and the hammer 47. The spindle 8 and the hammer 47 are movable relative to each other in the axial direction and in the circumferential direction with the balls 48 in between. Although the hammer 47 stops rotating, the spindle 8 continues to rotate with power generated by the motor 6. When the hammer 47 stops rotating and the spindle 8 rotates, the balls 48 move backward as being guided along the spindle groove 8G and the hammer groove 47G. The outer circumferential surface 8S of the spindle 8 and the inner circumferential surface 47S of the hammer 47 slide on each other. The hammer 47 receives a force from the balls 48 to move backward with the balls 48. In other words, the hammer 47 moves backward when the anvil stops rotating and the spindle 8 rotates. Thus, the hammer protrusions 47D are apart from the anvil protrusions 10B.

The coil spring 49 constantly generates an elastic force for moving the hammer 47 forward. The hammer 47 that has moved backward then moves forward under the elastic force from the coil spring 49. When moving forward, the hammer 47 receives a force in the rotation direction from the balls 48. In other words, the hammer 47 moves forward while rotating. The hammer 47 then comes in contact with the anvil protrusions 10B while rotating. Thus, the anvil protrusions JOB are struck by the hammer protrusions 47D in the rotation direction. The anvil 10 receives power from the motor 6 and an inertial force from the hammer 47. The anvil thus rotates with high torque about the rotation axis AX.

The tool holder 11 surrounds a front portion of the anvil 10. The tool holder 11 holds the tip tool received in the tool hole 10C in the anvil 10. The tip tool is attachable to and detachable from the tool holder 11.

The tool holder 11 includes balls 71, a leaf spring 72, a sleeve 73, a coil spring 74, and a positioner 75.

The anvil 10 has support recesses 76 for supporting the balls 71. The anvil shaft 10A has two support recesses 76.

The balls 71 are supported on the anvil 10 in a movable manner. The balls 71 are received in the support recesses 76. The single ball 71 is received in the single support recess 76.

The anvil shaft 10A has a through-hole connecting the inner surfaces of the support recesses 76 and the inner surface of the tool hole 10C. The balls 71 each have a smaller diameter than the through-hole. The balls 71 supported in the support recesses 76 are received at least partially in the tool hole 10C. The balls 71 fasten the tip tool received in the tool hole 10C. The balls 71 are movable between an engagement position and a release position. At the engagement position, the balls 71 fasten the tip tool. At the release position, the balls 71 unfasten the tip tool.

The leaf spring 72 generates an elastic force for moving the balls 71 to the engagement position. The leaf spring 72 surrounds the anvil shaft 10A. The leaf spring 72 generates an elastic force for moving the balls 71 forward.

The sleeve 73 is cylindrical. The sleeve 73 surrounds the anvil shaft 10A. The sleeve 73 is movable in the axial direction around the anvil shaft 10A. The sleeve 73 restricts the balls 71 at the engagement position from coming out of the engagement position. The sleeve 73 moves in the axial direction to permit the balls 71 to be movable from the engagement position to the release position.

The sleeve 73 is movable between a movement-restricting position and a movement-permitting position around the anvil shaft 10A. At the movement-restricting position, the sleeve 73 restricts radially outward movement of the balls 71. At the movement-permitting position, the sleeve 73 permits radially outward movement of the balls 71.

The sleeve 73 at the movement-restricting position restricts the balls 71 at the engagement position from moving radially outward. In other words, the sleeve 73 at the movement-restricting position restricts the balls 71 from coming out of the engagement position. Thus, the tip tool remains fastened by the balls 71.

The sleeve 73 moves to the movement-permitting position to permit the balls 71 at the engagement position to move radially outward. The sleeve 73 moves to the movement-permitting position to permit the balls 71 to move from the engagement position to the release position. In other words, the sleeve 73 at the movement-permitting position permits the balls 71 to come out of the engagement position. This causes the tip tool fastened by the balls 71 to be unfastened.

The coil spring 74 generates an elastic force for moving the sleeve 73 to the movement-restricting position. The coil spring 74 surrounds the anvil shaft 10A. The movement-restricting position is defined rearward from the movement-permitting position. The coil spring 74 generates an elastic force for moving the sleeve 73 backward.

The positioner 75 is annular and is fixed on the outer surface of the anvil shaft 10A. The positioner 75 is fixed to face the rear end of the sleeve 73. The positioner 75 positions the sleeve 73 at the movement-restricting position. The sleeve 73 under an elastic force from the coil spring 74 for moving backward comes in contact with the positioner 75 and is positioned at the movement-restricting position.

The fan 12 is located rearward from the stator 26. The fan 12 generates an airflow for cooling the motor 6. The fan 12 is fastened to at least a part of the rotor 27. The fan 12 is fastened to a rear portion of the rotor shaft 33 with a bush 12A. The fan 12 is located between the rear rotor bearing 37 and the stator 26. The fan 12 rotates as the rotor 27 rotates. As the rotor shaft 33 rotates, the fan 12 rotates together with the rotor shaft 33. Air outside the housing 2 thus flows into the internal space of the housing 2 through the inlets 19 and flows through the internal space of the housing 2 to cool the motor 6. As the fan 12 rotates, the air passing through the housing 2 flows out of the housing 2 through the outlets 20.

The battery mount 13 is located in a lower portion of the battery holder 23. The battery mount 13 is connected to the battery pack 25. The battery pack 25 is attached to the battery mount 13 in a detachable manner. The battery pack 25 is placed onto the battery mount 13 from the front of the battery holder 23 and is thus attached to the battery mount 13. The battery pack 25 is pulled forward along the battery mount 13 and is thus detached from the battery mount 13. The battery pack 25 includes a secondary battery. The battery pack 25 in the embodiment includes a rechargeable lithium-ion battery. The battery pack 25 is attached to the battery mount 13 to power the impact tool 1. The motor 6 is driven by power supplied from the battery pack 25. The operation display 16 is operated by power supplied from the battery pack 25.

The trigger lever 14 is located on the grip 22. The trigger lever 14 is operable by the operator to activate the motor 6. The trigger lever 14 is operable to switch the motor 6 between the driving state and the stopped state.

The forward-reverse switch lever 15 is located above the grip 22. The forward-reverse switch lever 15 is operable by the operator. The forward-reverse switch lever is operable to switch the rotation direction of the motor 6 between forward and reverse. This operation switches the rotation direction of the spindle 8.

The operation display 16 is located in the battery holder 23. The operation display 16 is located on the upper surface of the battery holder 23 frontward from the grip 22. The operation display 16 includes one or more operation buttons 16A (multiple operation buttons 16A in the embodiment). The operation buttons 16A are operable by the operator to change the operational mode of the motor 6.

The light assembly 18 emits illumination light. The light assembly 18 illuminates the anvil 10 and an area around the anvil 10 with illumination light. The light assembly 18 illuminates an area ahead of the anvil 10 with illumination light. The light assembly 18 also illuminates the tip tool attached to the anvil 10 and an area around the tip tool with illumination light. The light assembly 18 in the embodiment includes light units on the left and the right of the hammer case cover 51. Each light unit in the light assembly 18 includes a circuit board 18A, a light emitter 18B, and an optical member 18C. The light emitter 18B is supported on the circuit board 18A. Light emitted from the light emitter 18B passes through the optical member 18C.

The position of the light emitter 18B is not limited. The light emitter 18B may be, for example, above the trigger lever 14.

Supply of Lubricant Oil

The spindle 8 has an internal space 60. The spindle 8 has an opening 59 in its rear end face. The opening 59 in the embodiment is at the rear end of the holder 8E. The internal space 60 is defined in the spindle 8 and extends frontward from the opening 59.

The internal space 60 includes a first space 61 and a second space 62. The first space 61 is located frontward from the second space 62. The rear end of the first space 61 connects to the front end of the second space 62. The opening 59 is located at the rear end of the second space 62. The first space 61 and the second space 62 are circular in a cross section orthogonal to the rotation axis AX. The first space 61 has a smaller inner diameter than the second space 62. A step 63 is located at the boundary between the rear end of the first space 61 and the front end of the second space 62.

The first space 61 may have a larger inner diameter than the second space 62.

The first space 61 is filled with a lubricant oil. The lubricant oil includes grease. The first space 61 includes a rear space 61A and a front space 61B in the embodiment. The rear space 61A connects to the front end of the second space 62. The front space 61B is located frontward from the rear space 61A. The rear end of the front space 61B connects to the front end of the rear space 61A. The front space 61B has a smaller inner diameter than the rear space 61A.

The impact tool 1 has a lid 5 for closing the opening 59. The lid 5 reduces any leak of the lubricant oil contained in the internal space 60 through the opening 59. The lid 5 is placed into the internal space 60 through the opening 59. The lid 5 is located in the second space 62.

The lid 5 is substantially cylindrical. The lid 5 has its outer circumferential surface in contact with the inner circumferential surface of the second space 62 and its front edge supported by the step 63.

The lid 5 may be formed from a metal, a synthetic resin, or rubber. The lid 5 in the embodiment is formed from felt. Felt may be, for example, wool felt. Before being placed into the second space 62, the lid 5 has an outer diameter larger than the inner diameter of the second space 62. The felt lid 5 is deformable. The lid 5 is placed into the second space 62 while being deformed. This causes the outer circumferential surface of the lid 5 to be in tight contact with the inner circumferential surface of the second space 62.

The pinion gear 41 is placed in the second space 62. In the second space 62, the pinion gear 41 is placed rearward from the lid 5. The pinion gear 41 is placed into the second space 62 through the opening 59. After the lid 5 is placed into the second space 62 through the opening 59, the pinion gear 41 fixed to the front end of the rotor shaft 33 is placed into the second space 62 through the opening 59.

The spindle 8 has first feed ports 81, second feed ports 82, and a third feed port 83.

The first feed ports 81 are located on an outer circumferential surface of the spindle shaft 8A. The first feed ports 81 allow supply of the lubricant oil from the first space 61 to between the spindle 8 and the hammer 47. The first feed ports 81 in the embodiment allow supply of the lubricant oil to between the outer circumferential surface 8S of the spindle shaft 8A and the inner circumferential surface 47S of the inner cylinder 47C. The first feed ports 81 connect to the rear space 61A in the first space 61 through a first flow channel 91 defined inside the spindle shaft 8A. The first flow channel 91 extends radially outward from the rear space 61A to connect the rear space 61A with the first feed ports 81. Under a centrifugal force from the spindle 8, the lubricant oil contained in the rear space 61A flows through the first flow channel 91 toward the first feed ports 81. The lubricant oil supplied to the first feed ports 81 is supplied to between the outer circumferential surface 8S of the spindle shaft 8A and the inner circumferential surface 47S of the inner cylinder 47C.

When the hammer 47 stops and the spindle 8 rotates, the outer circumferential surface 8S of the spindle 8 and the inner circumferential surface 47S of the hammer 47 slide on each other. The lubricant oil is supplied to between the sliding surfaces, or more specifically, to the outer circumferential surface 8S and the inner circumferential surface 47S, to reduce wear or seizure of the outer circumferential surface 8S and the inner circumferential surface 47S.

The feed ports 81 are arranged in the circumferential direction. The first feed ports 81 in the embodiment have a first feed port 81A and a first feed port 81B. The first feed port 81B is at a position different from the first feed port 81A in the circumferential direction. The first feed port 81A is substantially at the same position as the first feed port 81B in the front-rear direction.

The second feed ports 82 are located on the outer circumferential surface of the spindle shaft 8A. The second feed ports 82 are located frontward from the first feed ports 81 on the outer circumferential surface of the spindle shaft 8A. The second feed ports 82 allow supply of the lubricant oil from the first space 61 to the balls 48. The second feed ports 82 also allow supply of the lubricant oil to between the outer circumferential surface of the spindle shaft 8A and the inner circumferential surface of the inner cylinder 47C. The lubricant oil supplied to the surfaces of the balls 48 allows supply of the lubricant oil to the inner surface of the spindle groove 8G and the inner surface of the hammer groove 47G on which the balls 48 roll. The second feed ports 82 connect to the front space 61B in the first space 61 through a second flow channel 92 defined inside the spindle shaft 8A. The second flow channel 92 extends radially outward from the front space 61B to connect the front space 61B with the second feed ports 82. Under a centrifugal force from the spindle 8, the lubricant oil contained in the front space 61B flows through the second flow channel 92 toward the second feed ports 82. The lubricant oil fed through the second feed ports 82 is supplied to the surfaces of the balls 48. The lubricant oil fed through the second feed ports 82 is also supplied to between the outer circumferential surface of the spindle shaft 8A and the inner circumferential surface 47S of the inner cylinder 47C.

The second feed ports 82 are arranged in the circumferential direction. The second feed ports 82 in the embodiment have a second feed port 82A and a second feed port 82B. The second feed port 82B is at a position different from the second feed port 82A in the circumferential direction. The second feed port 82A is substantially at the same position as the second feed port 82B in the front-rear direction.

The first feed ports 81 and the second feed ports 82 are at different positions in the circumferential direction. In the embodiment, the first feed ports 81 and the second feed ports 82 are at positions different by 90 degrees in the circumferential direction. The first feed port 81A and the first feed port 81B are at positions different from each other by 180 degrees in the circumferential direction. The second feed port 82A and the second feed port 82B are at positions different from each other by 180 degrees in the circumferential direction.

When the first feed port 81A is at an angular position of 0 degrees, the second feed port 82A is at an angular position of 90 degrees. The first feed port 81B is at an angular position of 180 degrees. The second feed port 82B is at an angular position of 270 degrees.

These relative angles between the first feed ports 81 and the second feed ports 82 in the circumferential direction are mere examples. The first feed ports 81 may not be two first feed ports 81, which may be replaced by a single first feed port 81 or by three or more first feed ports 81. The second feed ports 82 may not be two second feed ports 82, which may be replaced by a single second feed port 82 or by three or more second feed ports 82.

The third feed port 83 is located in the front end face of the spindle 8. The third feed port 83 allows supply of the lubricant oil from the first space 61 to between the spindle 8 and the anvil 10. The third feed port 83 in the embodiment is located in the front end face of the spindle protrusion 8F. The third feed port 83 in the embodiment allows supply of the lubricant oil to between the surface of the spindle protrusion 8F and the inner surface of the anvil recess 10D. The third feed port 83 connects to the front end of the front space 61B. The lubricant oil supplied from the front space 61B to the third feed port 83 is supplied to between the surface of the spindle protrusion 8F and the inner surface of the anvil recess 10D.

The spindle shaft 8A may have a spindle recess on its front end. The anvil 10 may have, on its rear end face, an anvil projection received in the spindle recess. The third feed port 83 may be in the inner surface of the spindle recess.

The inner cylinder 47C in the hammer 47 has a first groove 47R on its inner circumferential surface. The first groove 47R is recessed radially outward from the inner circumferential surface of the inner cylinder 47C. The first groove 47R surrounds the spindle shaft 8A. The first groove 47R is located frontward from the first feed ports 81. The first groove 47R is located between the first feed ports 81 and the second feed ports 82 in the front-rear direction. The first groove 47R may be located rearward from the first feed ports 81 or may be located to face the first feed ports 81. The first groove 47R contains the lubricant oil. The lubricant oil contained in the first groove 47R is supplied to between the outer circumferential surface of the spindle shaft 8A and the inner circumferential surface of the inner cylinder 47C.

The spindle protrusion 8F has a second groove 8R on its outer circumferential surface. The second groove 8R is recessed radially inward from the outer circumferential surface of the spindle protrusion 8F. The second groove 8R surrounds the rotation axis AX. The second groove 8R contains the lubricant oil. The lubricant oil contained in the second groove 8R is supplied to between the surface of the spindle protrusion 8F and the inner surface of the anvil recess 10D.

When the spindle shaft 8A has the spindle recess on its front end and the anvil 10 has, on its rear end face, the anvil projection received in the spindle recess, the second groove 8R may be located on the inner circumferential surface of the spindle recess.

Operation of Impact Tool

The operation of the impact tool 1 will now be described. To perform, for example, a screwing operation on a workpiece, a tip tool (screwdriver bit) for the screwing operation is placed into the tool hole 10C in the anvil 10. The tip tool in the tool hole 10C is held by the tool holder 11. The operator then holds the grip 22 with, for example, the right hand and pulls the trigger lever 14 with the right index finger. Power is then supplied from the battery pack 25 to the motor 6 to activate the motor 6 and turn on the light assembly 18 simultaneously. This rotates the rotor shaft 33 in the rotor 27. The rotational force of the rotor shaft 33 is then transmitted to the planetary gears 42 through the pinion gear 41. The planetary gears 42 revolve about the pinion gear 41 while rotating and meshing with the internal teeth on the internal gear 43. The planetary gears 42 are rotatably supported by the spindle 8 with the pin 42P in between. The revolving planetary gears 42 rotate the spindle 8 at a lower rotational speed than the rotor shaft 33.

When the spindle 8 rotates with the hammer protrusions 47D and the anvil protrusions 10B in contact with each other, the anvil 10 rotates together with the hammer 47 and the spindle 8. Thus, the screw fastening operation proceeds.

When the anvil 10 receives a predetermined or higher load as the screw fastening operation proceeds, the anvil 10 and the hammer 47 stop rotating. When the spindle 8 rotates in this state, the hammer 47 moves backward. Thus, the hammer protrusions 47D are apart from the anvil protrusions 10B. The hammer 47 that has moved backward moves forward while rotating under an elastic force from the coil spring 49. Thus, the anvil 10 is struck by the hammer 47 in the rotation direction. The anvil 10 thus rotates about the rotation axis AX at high torque. The screw is thus fastened to the workpiece under high torque.

As described above, the impact tool 1 according to the embodiment includes the motor 6, the spindle 8, the hammer 47, the anvil 10, and the lid 5. The spindle 8 is at least partially located frontward from the motor 6 and is rotatable by the motor 6. The spindle 8 has the opening 59 in its rear end face, the internal space 60 extending frontward from the opening 59, and the first feed ports 81 in the outer circumferential surface 8S of the spindle 8. The internal space 60 includes the first space 61 containing the lubricant oil and the second space 62 connecting to the rear end of the first space 61. The hammer 47 surrounds the spindle 8. The anvil 10 is at least partially located frontward from the spindle 8 and is struck by the hammer 47 in the rotational direction. The lid 5 is placed through the opening 59 into the second space 62. The first feed ports 81 allow supply of the lubricant oil from the first space 61 to between the spindle 8 and the hammer 47.

In the structure described above, the lid 5 is placed in the second space 62 in a portion rearward from the first space 61 containing the lubricant oil. This structure reduces any leak of the lubricant oil contained in the first space 61 through the opening 59. This structure reduces the likelihood of less lubricant oil being supplied through the first feed ports 81 to between the spindle 8 and the hammer 47. This thus reduces wear or seizure of the spindle 8 and the hammer 47. The impact tool 1 is thus less likely to have a shorter service life.

The lid 5 in the embodiment may be formed from felt.

The lid 5 can be placed into the second space 62 through the opening 59 without workability being reduced. An assembler of the impact tool 1 can place the deformable felt into the second space 62 while the felt is being deformed. This allows the lid 5 to be placed into the second space 62 easily. The felt with an outer diameter larger than the inner diameter of the second space 62 is placed into the second space 62 while being deformed. The outer circumferential surface of the felt is thus in tight contact with the inner circumferential surface of the second space 62. This improves the sealing between the outer circumferential surface of the felt and the inner circumferential surface of the second space 62. This effectively reduces any leak of the lubricant oil contained in the first space 61 through the opening 59.

In the embodiment, the first space 61 may have a smaller inner diameter than the second space 62.

The lid 5 with an outer diameter larger than the inner diameter of the first space 61 is placed in the second space 62.

In the embodiment, the step 63 may be located at the boundary between the rear end of the first space 61 and the front end of the second space 62. The step 63 may support the lid 5.

This reduces the likelihood that the lid 5 placed in the second space 62 through the opening 59 enters the first space 61. The lid 5 is positioned by the step 63 in the front-rear direction.

The hammer 47 in the embodiment may include the body 47A and the inner cylinder 47C protruding rearward from the body 47A and having the inner circumferential surface 47S in contact with the outer circumferential surface 8S of the spindle 8. The first feed ports 81 may allow supply of the lubricant oil to between the outer circumferential surface 8S of the spindle 8 and the inner circumferential surface 47S of the inner cylinder 47C.

This structure reduces wear or seizure of the outer circumferential surface 8S of the spindle 8 and the inner circumferential surface 47S of the inner cylinder 47C.

The spindle 8 in the embodiment may have the first feed ports 81 in the circumferential direction.

The first feed ports 81 allow uniform supply of the lubricant oil to between the outer circumferential surface 8S of the spindle 8 and the inner circumferential surface 47S of the inner cylinder 47C.

The inner cylinder 47C in the embodiment may have, on the inner circumferential surface 47S, the first groove 47R to contain the lubricant oil.

The lubricant oil supplied from the first groove 47R to between the outer circumferential surface 8S of the spindle 8 and the inner circumferential surface 47S of the inner cylinder 47C can reduce wear or seizure of the outer circumferential surface 8S of the spindle 8 and the inner circumferential surface 47S of the inner cylinder 47C.

The first groove 47R in the embodiment may be located frontward from the first feed ports 81.

The first feed ports 81 at positions different from the first groove 47R in the front-rear direction allow uniform supply of the lubricant oil to between the outer circumferential surface 8S of the spindle 8 and the inner circumferential surface 47S of the inner cylinder 47C.

The impact tool 1 according to the embodiment may include balls 48 between the spindle 8 and the hammer 47. The spindle 8 may have, on the outer circumferential surface 8S, second feed ports 82 located frontward from the first feed ports 81 to allow supply of the lubricant oil from the first space 61 to the balls 48.

This structure allows supply of the lubricant oil from the first space 61 to the balls 48, thus reducing wear of the balls 48. This also reduces any wear of the inner surface of the spindle groove 8G and the inner surface of the hammer groove 47G in contact with the balls 48.

The spindle 8 in the embodiment may have the second feed ports 82 in the circumferential direction.

This allows uniform supply of the lubricant oil to the balls 48.

In the embodiment, the first feed ports 81 and the second feed ports 82 may be at different positions in the circumferential direction.

This allows uniform supply of the lubricant from the first space 61 to the spindle 8, the hammer 47, and the balls 48.

The spindle 8 in the embodiment may have, on its front end face, the third feed port 83 to allow supply of the lubricant oil from the first space 61 to between the spindle 8 and the anvil 10.

This structure allows supply of the lubricant oil from the first space 61 to between the spindle 8 and the anvil 10, thus reducing wear of the spindle 8 and the anvil 10.

The spindle 8 in the embodiment may include the spindle shaft 8A and the spindle protrusion 8F protruding frontward from the front end of the spindle shaft 8A. The anvil 10 may have, on its rear end face, the anvil recess 10D receiving the spindle protrusion 8F. The hammer 47 may surround the spindle shaft 8A. The third feed port 83 may be located on the front end face of the spindle protrusion 8F.

This structure allows supply of the lubricant oil from the first space 61 to between the spindle protrusion 8F and the anvil recess 10D, thus reducing wear of the surface of the spindle protrusion 8F and the inner surface of the anvil recess 10D.

The spindle protrusion 8F in the embodiment may have, on its outer circumferential surface, the second groove 8R to contain the lubricant oil.

This structure allows supply of the lubricant oil from the second groove 8R to between the spindle protrusion 8F and the anvil recess 10D, thus reducing wear of the surface of the spindle protrusion 8F and the inner surface of the anvil recess 10D.

Modifications

Figure 7:
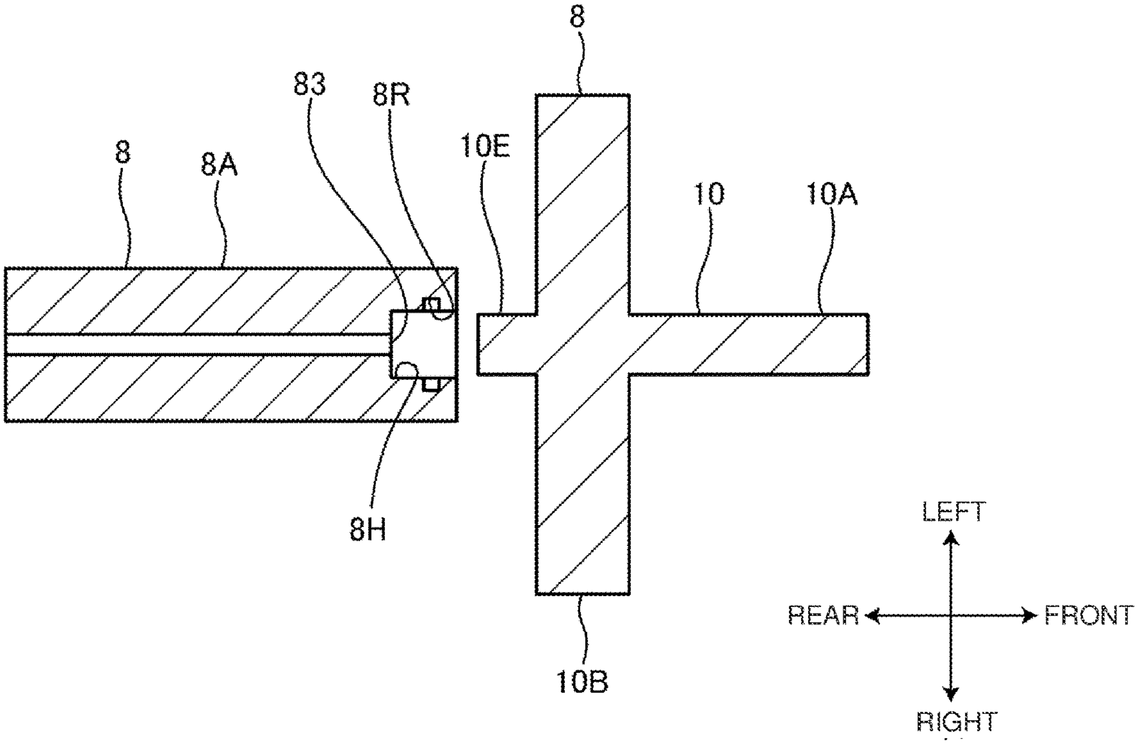
FIG. 7 is a schematic cross-sectional view of a spindle and an anvil in a modification.

FIG. 7 is a schematic cross-sectional view of a spindle 8 and an anvil 10 in a modification. In the above embodiment, the spindle 8 has the spindle shaft 8A and the spindle protrusion 8F protruding frontward from the front end of the spindle shaft 8A, and the anvil 10 has the anvil recess 10D on the rear end surface to receive the spindle protrusion 8F.

In the modification, the spindle 8 may have a spindle shaft 8A and a spindle recess 8H recessed rearward from the front end of the spindle shaft 8A, and the anvil 10 may have, on its rear end face, an anvil projection 10E protruding rearward and received in the spindle recess 8H. The third feed port 83 may be located on the inner surface of the spindle recess 8H. The spindle recess 8H may have, on its inner circumferential surface, a second groove 8R to contain the lubricant oil.

Figure 8:
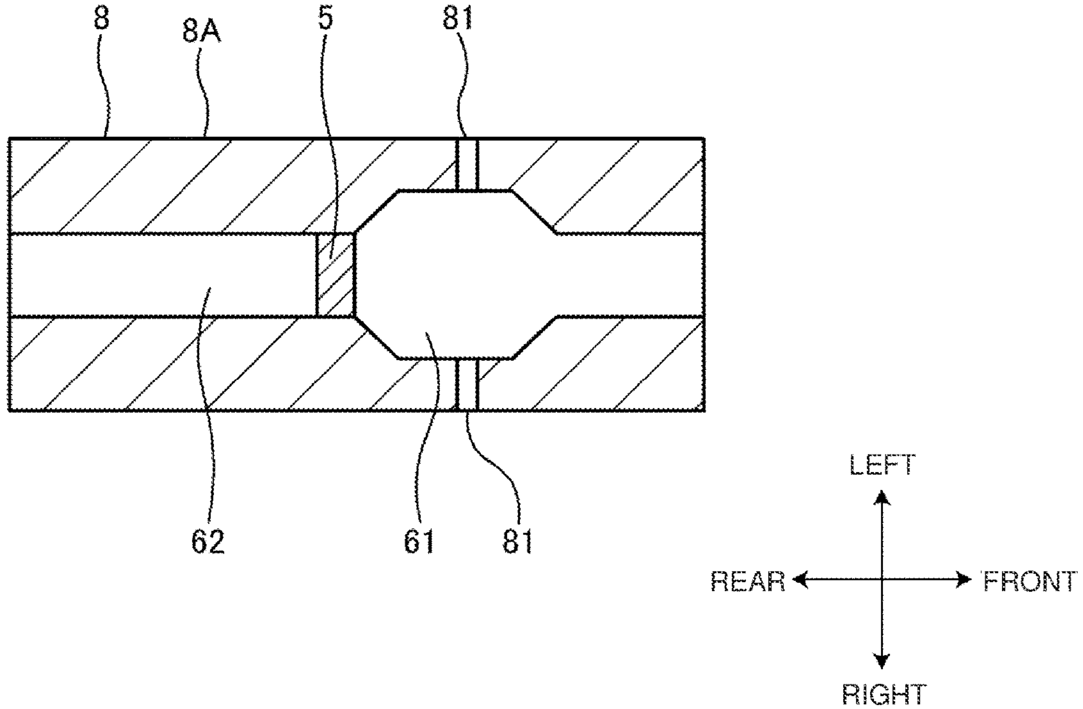
FIG. 8 is a schematic cross-sectional view of a spindle in a modification.

FIG. 8 is a schematic cross-sectional view of a spindle 8 in a modification. In the above embodiment, the first space 61 has a smaller inner diameter than the second space 62. As shown in FIG. 8, the first space 61 may have a larger inner diameter than the second space 62.

In the above embodiment, the impact tool 1 is an impact driver. The impact tool 1 may be an impact wrench.

In the above embodiment, the impact tool 1 may use utility power (alternating current power supply) instead of the battery pack 25.

REFERENCE SIGNS LIST

1 impact tool
2 housing
2L left housing
2R right housing
2S screw
3 rear cover
3S screw
4 hammer case
4A larger cylinder
4B smaller cylinder
4C connecting portion
5 lid
6 motor
7 reducer
8 spindle
8A spindle shaft
8B first flange
8C second flange
8D connecting portion
8E holder
8F spindle protrusion
8G spindle groove
8H spindle recess
8R second groove
8S outer circumferential surface
9 striker
10 anvil
10A anvil shaft
10B anvil protrusion
10C tool hole
10D anvil recess
10E anvil protrusion
11 tool holder
12 fan
12A bush
13 battery mount
14 trigger lever
15 forward-reverse switch lever
16 operation display
16A operation button
18 light assembly
18A circuit board
18B light emitter
18C optical member
19 inlet
20 outlet
21 motor compartment
22 grip
23 battery holder
24 bearing box
24A rear annular portion

24B front annular portion
24C connecting portion
25 battery pack
26 stator
27 rotor
28 stator core
29 rear insulator
30 front insulator
30S screw
31 coil
32 rotor core
33 rotor shaft
34 rotor magnet
35 sensor board
36 fusing terminal
37 rear rotor bearing
38 front rotor bearing
39A O-ring
39B O-ring
41 pinion gear
42 planetary gear
42P pin
43 internal gear
44 spindle bearing
45 O-ring
46 anvil bearing
47 hammer
47A body
47B outer cylinder
47C inner cylinder
47D hammer protrusion
47E recess
47G hammer groove
47R first groove
47S inner circumferential surface
48 ball
49 coil spring
50 washer
51 hammer case cover
52 bumper
54 ball
56 washer
57 support
58 washer
59 opening
60 internal space
61 first space
61A rear space
61B front space
62 second space
63 step
71 ball
72 leaf spring
73 sleeve
74 coil spring
75 positioner
76 support recess
81 first feed port
81A first feed port
81B first feed port
82 second feed port
82A second feed port
82B second feed port
83 third feed port
91 first flow channel
92 second flow channel
AX rotation axis

What is claimed is:

1. An impact tool, comprising:

a motor;

a spindle at least partially located frontward from the motor, the spindle being rotatable by the motor, the spindle having an opening in a rear end face of the spindle, an internal space extending frontward from the opening, the internal space including a first space containing a lubricant oil, and a second space connecting to a rear end of the first space, and a first feed port in an outer circumferential surface of the spindle;

a hammer surrounding the spindle;

an anvil at least partially located frontward from the spindle, the anvil being strikable by the hammer in a rotation direction; and a lid placeable through the opening into the second space, wherein the first feed port allows supply of the lubricant oil from the first space to between the spindle and the hammer.

2. The impact tool according to claim 1, wherein the lid comprises felt.

3. The impact tool according to claim 1, wherein the lid comprises a metal, a synthetic resin, or rubber.

4. The impact tool according to claim 1, wherein the first space has a smaller inner diameter than the second space.

5. The impact tool according to claim 4, further comprising:

a step at a boundary between the rear end of the first space and a front end of the second space, the step supporting the lid.

6. The impact tool according to claim 1, wherein the first space has a larger inner diameter than the second space.

7. The impact tool according to claim 1, wherein the hammer includes a body, and an inner cylinder protruding rearward from the body and having an inner circumferential surface in contact with an outer circumferential surface of the spindle, and the first feed port allows supply of the lubricant oil to between the outer circumferential surface of the spindle and the inner circumferential surface of the inner cylinder.

8. The impact tool according to claim 7, wherein the spindle has a plurality of the first feed ports in a circumferential direction.

9. The impact tool according to claim 7, wherein the inner cylinder has, on the inner circumferential surface, a first groove to contain the lubricant oil.

10. The impact tool according to claim 1, further comprising:

a ball between the spindle and the hammer, wherein the spindle has, on the outer circumferential surface, a second feed port located frontward from the first feed port to allow supply of the lubricant oil from the first space to the ball.

11. The impact tool according to claim 10, wherein the spindle has a plurality of the second feed ports in a circumferential direction.

12. The impact tool according to claim 10, wherein the first feed port and the second feed port are at different positions in a circumferential direction.

13. The impact tool according to claim 1, wherein the spindle has, in a front end face of the spindle, a third feed port to allow supply of the lubricant oil from the first space to between the spindle and the anvil.

14. The impact tool according to claim 13, wherein the spindle includes a spindle shaft, and a spindle protrusion protruding frontward from a front end of the spindle shaft, the anvil has, on a rear end face of the anvil, an anvil recess receiving the spindle protrusion, the hammer surrounds the spindle shaft, and the third feed port is located in a front end face of the spindle protrusion.

15. The impact tool according to claim 14, wherein the spindle protrusion has, on an outer circumferential surface of the spindle protrusion, a second groove to contain the lubricant oil.

16. The impact tool according to claim 13, wherein the spindle includes a spindle shaft, and a spindle recess recessed rearward from a front end of the spindle shaft, the anvil includes, on a rear end face of the anvil, an anvil projection received in the spindle recess, the hammer surrounds the spindle shaft, and the third feed port is located in an inner surface of the spindle recess.

17. The impact tool according to claim 16, wherein the spindle recess has, on an inner circumferential surface of the spindle recess, a second groove to contain the lubricant oil.

* * * * *